United States Patent [19]

Stoll et al.

[11] Patent Number: 5,205,568
[45] Date of Patent: Apr. 27, 1993

[54] SEALING RING

[75] Inventors: Kurt Stoll, Esslingen; Herbert Koengeter, Reichenbach, both of Fed. Rep. of Germany

[73] Assignee: Festo KG, Esslingen, Fed. Rep. of Germany

[21] Appl. No.: 849,766

[22] Filed: Mar. 12, 1992

[30] Foreign Application Priority Data

Mar. 14, 1991 [DE] Fed. Rep. of Germany ....... 4108221

[51] Int. Cl.$^5$ .................. F16J 15/32; F16L 37/00
[52] U.S. Cl. ..................... 277/205; 277/27;
277/152; 277/212 R; 285/104; 285/340
[58] Field of Search ............. 277/152, 205, 212 R,
277/212 C, 27; 285/104, 110, 111 C, 321,
339–342

[56] References Cited

U.S. PATENT DOCUMENTS

| 2,111,956 | 3/1938 | Baldwin | 285/33 |
| 2,230,725 | 2/1941 | Nathan | 285/340 |
| 2,907,596 | 10/1959 | Maha | 277/205 |
| 4,146,254 | 3/1979 | Turner et al. | 285/340 |
| 4,371,177 | 2/1983 | Bahr | 277/105 |
| 4,747,626 | 5/1988 | Hama et al. | 285/340 |
| 4,898,081 | 2/1990 | Fecher | 277/152 |
| 4,919,457 | 4/1990 | Moretti | 285/340 |

FOREIGN PATENT DOCUMENTS 1048104 12/1958 Fed. Rep. of Germany ........ 285/33

Primary Examiner—William A. Cuchlinski, Jr.
Assistant Examiner—Daniel G. DePumpo
Attorney, Agent, or Firm—Flynn, Thiel, Boutell & Tanis

[57] ABSTRACT

A sealing ring for sealing off a joint between a fluid power line and a fluid power component to be connected therewith. At one axial side the sealing ring has two overpressure sealing lips arranged in a v configuration. At the opposite axial side a thrust portion is provided for cooperation with a gripping element. The thrust portion and an inner underpressure sealing portion provided thereon define a radially moving pivot ring. If the fluid power line is under vacuum, the pressure of the surroundings causes the pivot ring to be shifted inwards and the underpressure sealing portion is thrust sealingly against other surface of the fluid power line.

15 Claims, 1 Drawing Sheet

SEALING RING

FIELD OF THE INVENTION

The invention relates to a sealing ring for sealing a connection between a fluid power line and a fluid power joint element, the sealing ring being arranged between a cylindrical sealing surface of a female socket part in the joint element and an outer surface of the fluid power line introduced into the female socket part from an insertion end thereof, wherein first and second overpressure sealing lips have a V-like configuration on a first axially facing side thereof is remote from the insertion end, the first overpressure sealing lip being radially outwardly of the second overpressure sealing lip and sealing engages with the sealing surface and the second radially inner overpressure sealing lip operatively sealingly engaging with the outer surface of the fluid power line, and a thrust portion adapted to act on a gripper sleeve of the joint element.

BACKGROUND OF THE INVENTION

It is more particularly in the pneumatics field that rigid or flexible, hose-like fluid power lines are frequently utilized as part of a releasable plug-in connection on fluid power joint elements, such as screw in or other type pipes fittings. In this respect, the joint element has a female socket part into whose end the fluid power line is inserted. In the inserted condition, the fluid power line is encircled by a resilient gripper sleeve, whose resilient gripping fingers act on the outer surface of the fluid power line to secure it in position. In order to seal off the plug-in connection, a sealing ring is arranged in the female socket, which on the one hand acts on an annular and generally cylindrical seal surface of the joint element and on the other hand surrounds the fluid power line coaxially with a sealing action.

A sealing ring, of the type initially mentioned, used for such purposes is described in European patent publication 0 379 655 A2. In its operational position it is arranged axially between an annular shoulder in the female socket and the gripping fingers of a gripper sleeve. On an axially inwardly facing side facing in the direction of insertion, two sealing lips form a V-like configuration which function as overpressure sealing lips, that is to say are responsible for a sealing action when there is an overpressure in the fluid power line. Since the seal is arranged in an axially sliding manner in the female socket, it is shifted towards the insertion end when there is an overpressure in the fluid power line, a thrust part provided or the axially outwardly facing side then cooperating with the gripping elements and thrusting the same additionally towards the periphery of the inserted fluid power line in order to enhance the gripping effect.

It has now been found that the during operation under vacuum, in which the pressure occurring in the fluid power line is less than the pressure of the surroundings, the known sealing ring does not provide a reliable sealing action under all conditions and, more particularly, when there is a high degree of vacuum, there may be entry of air from outside, something to be avoided under all circumstances.

SHORT SUMMARY OF THE INVENTION

One object of the present invention is to provide a sealing ring of the type initially mentioned which, while maintaining the action reinforcing the gripping action, guarantees a reliable sealing action both during operation with an overpressure and during operation with an underpressure without hindering insertion of the fluid power lines.

A further object of the invention is to allow for major inaccuracies in the external diameters of the fluid power lines to be inserted.

In order to achieve these and/or other objects in the present invention the thrust portion is defined by an annular axially extending projection which is of a reduced radially outermost dimension in relation to an axially adjoining section of the sealing ring so that in an operational position between the thrust portion and a radially inwardly facing and opposing sealing surface of the female socket there is an annular gap, and wherein a circumferentially extending inner underpressure sealing portion is provided on an inner surface of the thrust portion, and wherein the underpressure sealing portion together with the thrust portion define an integral pivot ring connected with an adjoining section of the sealing ring by means of a circumferentially extending flexible zone so that the inner underpressure sealing portion of the sealing ring in an operative position thereof is able to be pressed automatically radially inwardly against the outer surface of the fluid power line owing to a pressure differential when the fluid power line is at a lower pressure than the surroundings.

In addition to the overpressure sealing lips, there is an underpressure sealing portion which, in the case of underpressure or will be thrust against the outer surface of the inserted fluid power line only because of the occurring pressure differential. Owing to the flexible part, the underpressure sealing portion is attached in a highly radially flexible manner on the remaining section of the sealing ring and even in the case of minor pressure differentials is reliably effective. In this respect a decisive contribution is made by the surface parts responsible for pressing inwards are very large in size in comparison with the oppositely acting ones. This is owing to the fact that the underpressure sealing portion is united with the thrust portion as a single, integral component, which has a radial step on its periphery so that the pressure of the surroundings may act in many different manners. The radial step is furthermore responsible for a reduction of the thickness of the material in the bending part, thus enhancing elasticity. Furthermore, the pivot ring has sufficient space available to be deflected on insertion of a fluid power line having an oversize external diameter to move out of the way radially outwards and, therefore, to compensate for the diameter disparity. In this respect, the sealing ring is expediently manufactured of an elastomeric material, such as rubber, at least in the part with the pivot ring and so that any expansion which may be necessary for the pivot movement of the pivot ring is possible.

In order to ensure that an optimum underpressure sealing effect is possible in the part which is axially adjacent to the thrust portion it is convenient to provide a circumferentially extending external underpressure sealing portion. Since it is practically not able to compensate for any inaccuracies in diameter, it may be made very stiff and in the form of a bead so that it more or less constitutes a static sealing portion.

Because the inner underpressure sealing portion is practically automatically drawn against the outer surface of the inserted fluid power line, it is possible for the diameter of the inner underpressure sealing portion to be made larger than in the case of the inner overpressure sealing lip. This renders the insertion of a fluid power line simpler, because the pivot ring is more easily expanded. In conjunction with this, it is also an advantage if the insertion opening in the end zone of the pivot ring is made conical with a diameter decreasing axially inwardly so that there is defined a tapering insertion guide.

Further advantageous developments and convenient forms of the invention will be gathered from the following detailed account of one embodiment thereof in conjunction with the accompanying drawings.

DETAILED DESCRIPTION

Figure 2:
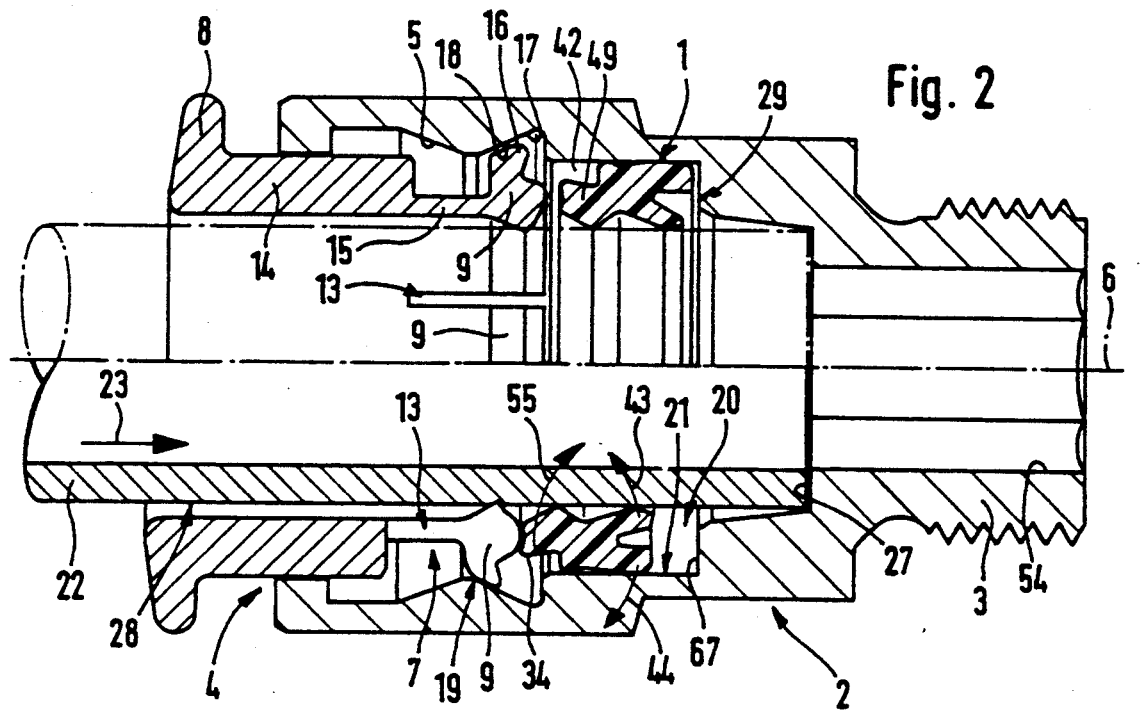
FIG. 2 shows the sealing ring of FIG. 1 in two operational conditions for sealing off the plug-in connection between a joint element and a fluid power line, in which respect above the longitudinal axis the fluid power line is only shown in broken lines and the sealing ring is in a first condition of underpressure operation and beneath the longitudinal axis, the sealing ring is in a second condition during overpressure operation, in each case in a longitudinal central section.
Figure 1:
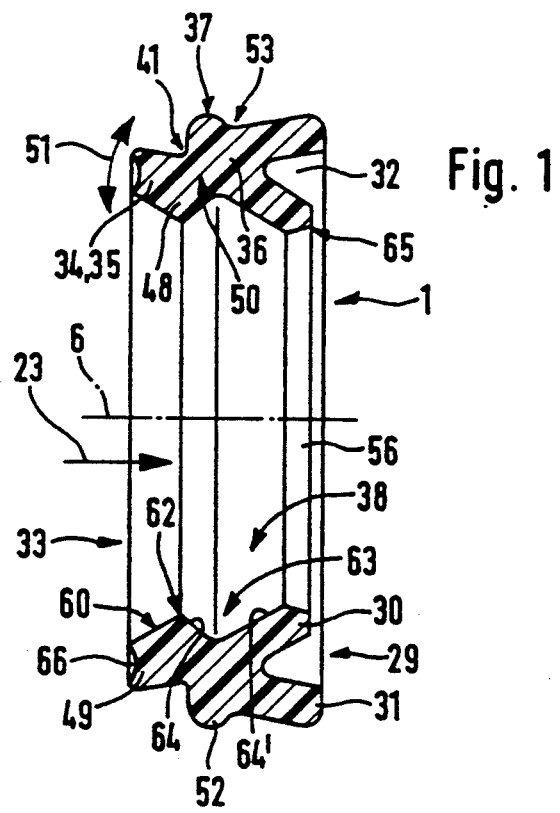
FIG. 1 shows a sealing ring in accordance with the invention as seen in a longitudinal, central cross section.

FIG. 2 illustrates, in an enlarged scale, a preferred embodiment of a sealing ring 1 also illstrated in FIG. 1. A joint element 2 consists of a threaded member 3 or spigot at one axial end thereof by which it is secured in a porthole of a fluid power component, more particularly a porthole of a valve or a piston and cylinder unit. At the opposite axial end, which hereinafter will be referred to as an insertion end 4, there is a female socket 5 in the joint element 2 having a depth which extends approximately as far as the part defining the threaded member 3. The female socket 5 contains a sleeve-like gripping sleeve 7, which preferably has a section 8 extending axially outward of the insertion end a sufficient distance enabling it to be held and manipulated. At the axially inward end part of the gripping sleeve 7 there is preferably provided a plurality of circumferentially spaced gripping fingers 9 which are separated from each other by slots 13 extending in a longitudinal direction thereof. The gripping fingers 9 are radially resilient and are contiguously arranged on an axially extending gripping sleeve section 14, the resilient properties preferably being due to a transitional zone 15 having a reduced radial wall thickness.

At a radially outer part of each gripping finger 9 there is provided an actuating portion 16 which fits into a annular groove-like recess 17 in the female socket 5. The recess has a conical surface section 18 facing the insertion end 4 whose diameter decreases towards the insertion end 4. The actuating portions 16 juxtaposed the conical surface sections 18 each preferably having a complementary oblique configuration 19. The width dimension of the annular recess 17 as measured in the axial direction 6 of the annular recess 17 and the axial length of the actuating portions 16 are preferably so matched in relation to each other that a relative axial movement between the gripping element 7 and the joint element 2 is possible.

Adjoining the inner end of the annular recess 17 there is a receiving section 20 for the sealing ring 1. In this part, the inner surface of the female socket 5 is a circularly cylindrical sealing surface 21. The sealing ring 1 is in the operational condition arranged in the receiving section 20, its outer periphery being in engagement with the sealing surface 21.

For creating a sealed connection, a fluid power line 22 is inserted from the insertion end 4 in the axial direction into the female socket 5. The direction of insertion is as indicated by the arrow 23. In this respect the fluid power line 22 extends both through the gripping element 7 and also the sealing ring 1, until its end is in engagement with an abutment step 27 provided at the axial inner end of the of the female socket 5. In the inserted condition, the gripping fingers 9 are biased or tensioned resiliently against an outer surface 28 of the fluid power line 22, into which they may bite in some cases. Furthermore, a radially inner surface of the sealing ring 1 is in sealing contact with the outer surface 28.

The sealing ring 1 illustrated by way of example has two coaxially arranged, annular, overpressure sealing lips 30 and 31 which are arranged in a V-like configuration on its end facing in the abutment step 27. The latter means that, as seen in FIG. 1, the sealing lips are radially aligned on an axially inwardly facing side 29 of the ring 1, and define an annular axially opening recess 32 is therebetween. In the initial position of the lips 30 and 31 in accordance with FIG. 1, both overpressure sealing lips have a form corresponding to the shape of a frustum of a cone, the two longitudinal axes thereof coinciding with the longitudinal axis 6. The lip end zone having a larger diameter extends axially to the right in FIG. 1 further than does the smaller diameter sealing lip 30.

Adjacent to the axially outwardly facing side 33 of the sealing ring 1 there is provided a coaxially extending thrust portion 34. The thrust portion 34 is defined by an annular axially extending projection 35 which, in relation to a middle section 36 of the sealing ring and an outer periphery 37 thereof, is stepped back radially inwardly. As a result, an annular step 41 or shoulder, in the operational state as shown in FIG. 2, is provided between the thrust portion 34 and the middle section 36 and this causes a radial intermediate space or annular gap 42 to be formed between the sealing surface 21 and the thrust portion 34.

If in the operational condition the fluid power line 22 is carrying fluid at a higher pressure than the surrounding pressure then it is possible for the fluid to flow between the end of the fluid line 22 and the abutment step 27 to the axially inwardly facing side 29 of the sealing ring 1. As a result the inner overpressure sealing lip 30 is thrust, as indicated by the arrow 43, against the outer surface 28 and the outer overpressure sealing lip 31 will be thrust as indicated by the arrow 44 against the sealing surface 21. An optimum sealing action is therefore assured. Simultaneously, however, the sealing ring 1 is shifted axially in a direction opposite to the insertion direction 23 so that, as shown in the lower half of FIG. 2, the thrust portion 34 is thrust axially against the gripping fingers 9. This results in a slight axial shift of the gripping element 7, the oblique sections 19 sliding along the oblique surface 18 and the gripping fingers 9 being more firmly thrust against the outer periphery of the fluid power line 22 to effect an enhancing of the gripping force and an automatic adaptation of the gripping force the respective pressure level in the fluid power line 22.

The sealing ring 1 is furthermore characterized in that even in the case of an underpressure operation, that is to say when the pressure in the fluid power line 22 is less than that of the surroundings, there is a reliable sealing action to prevent access of air from the surroundings into it.

For this purpose the thrust portion 34 is provided on its radially inner surface 38 of the sealing ring 1 with an integrally molded circumferentially extending inner underpressure sealing portion 48 which together with the thrust portion 34, define an integral pivot ring 49, is connected by a flexible circumferential zone 50 centered lengthwise on the middle section 36 of the sealing ring to the middle sections so as to be radially resilient and pivotable in relation to the middle section. This means that the radial position of the underpressure sealing portion 48 may be varied by radially shifting the thrust portion 34 as indicated by the double arrow 51 in FIG. 1. In this respect, since the pivot ring 49 is in the form of a complete uninterrupted loop, there is a circumferential expansion and a circumferential contraction of the loop, something that is not problematic owing to the elastomeric nature of the sealing ring 1.

Furthermore, there is preferably a circumferentially extending underpressure sealing portion 52 molded on the sealing ring 1 in the part of the outer periphery 37 which axially adjoins the thrust part 34. Such portion 52 is in the illustrated working embodiment directly adjacent to the transitional edge between the annular step 41 and the middle section 36 of the sealing ring. The sealing portion is preferably in the form of an annular bead so that in comparison with a sealing lips 30 and 31 it has a very short axial length. In the axial part between this outer underpressure sealing portion 52 and the outer overpressure sealing lip 31 there is preferably provided a circumferentially extending, coaxially arranged, radially outwardly opening recess 53.

The radially outwardly opening recess 53 is in reality very shallow. In the operational condition as shown in FIG. 2 it is hardly to be seen. This is due to the fact that the outer overpressure sealing lip 31 is, in the operational condition, bent radially inwards from the initial position thereof and, in practice, has hardly any axial extent.

During underpressure operation the axially outwardly facing side 33 is subjected to a greater pressure than is the axially inwardly facing side 29. Without the underpressure sealing portion 52, the overpressure sealing lips 30 and 31 would yield in the direction opposite to the arrows 43 and 44 and it would be possible for air from the surroundings to flow unhindered into the fluid power line 22 and the adjoining fluid power duct 54 extending through the threaded member 3. An overpressure present at the axially outwardly facing side 33 now, however, means that the pivot ring 49 will be pivoted or thrust radially inwards so that the underpressure sealing portion 48, which is integral with it, will come forcefully into engagement with the outer surface 28. The annular gap 42 ensures that a large effective surface is available which is acted upon by the atmospheric pressure.

The dimensions of the sealing ring 1 are preferably selected so that it is seated in the receiving section 20 with a radial tensioning effect at least when the fluid power line 22 is introduced. Accordingly, the outer underpressure sealing portion 52 is firmly thrust against the sealing surface 21, it being able to be elastically deformed so that there is an excellent sealing action. Furthermore, it is possible for the overpressure acting here to increase the engagement force. This is more particularly the case when the outer underpressure sealing portion 52 is designed in the form of a lip, not illustrated, the corresponding sealing lip then being extended both axially outwardly in a direction opposite to the insertion direction 23 and radially outwardly.

The bending zone 50 is preferably defined by a section having a reduced material thickness so as to increase flexibility.

In the design in accordance with FIG. 1, the diameters of the sections defining the inner sealing portion 48 and the sealing lip 30 of an insertion opening 56 are somewhat less than the external diameter of the fluid power line 22 to be inserted. In this manner, it is possible to ensure a basic tensioning in the inserted condition. In order to simplify insertion of the fluid power line 22, the portion of the insertion opening 56 adjacent the pivot ring is shaped in the form of a conical male spigot 60 whose diameter decreases in the direction of insertion 23.

The reduction of the external diameter caused by the step 41 adjacent to the thrust portion 34 means as well that an expansion of the pivot ring 49 is favored when a fluid power line is introduced.

In the illustrated working embodiment of the invention, the diameter of the insertion opening 56 adjacent to the inner underpressure sealing portion 48 is larger than adjacent to the inner overpressure sealing lip 30. The latter is very flexible and practically is a dynamic sealing lip which is able to allow for major inaccuracies in the external diameters of the fluid power line which are to be inserted. But, on the other hand, the outer overpressure sealing lip 31 practically is a static overpressure sealing lip, which only has to allow for a small degree of inaccuracy. The inner underpressure sealing portion 48 is, on the other hand, dynamic, because like the inner overpressure sealing lip 30, it is able to adapt itself to variations in diameter due to different or pulsating pressure loads.

It is an advantage if the outer underpressure sealing portion 52 as seen in FIG. 1 is axially arranged in the part between the inner underpressure sealing portion 48 and the inner overpressure sealing lip 30. In this manner, the freedom of movement of the pivot lip 49 is assured.

In the illustrated working embodiment of the invention, the inner underpressure sealing portion 48 is designed in the form of a sealing bead and possesses a circumferential extending sharp sealing edge 62 which faces radially inwardly and directly adjoins the insertion zone 60 and there follows, as seen in the insertion direction 23, a circumferential coaxial, radially inwardly facing, recess 63 which, as seen in the longitudinal section, has the configuration of a letter V. As regards details, it possesses in this particular working embodiment, two axially contiguous surface sections 64 and 64' which have oppositely directed slopes similar to the surface of the frustum of a cone. Towards the axially inwardly facing side 29 following the radially inwardly facing recess 63 there is the actual sealing zone 65 of the inner overpressure sealing lip 30 so that one surface section 64' is practically a component of the sealing lip itself.

In order to ensure that the thrust portion 34 may make optimum snug contact with the gripping fingers 9, it is preferably provided with an annular, axially outwardly facing, recess 66 in its axial end surface, the floor of this recess preferably being rounded.

It is convenient if at least in the initial position as shown in FIG. 1 the inner overpressure sealing lip 30 projects towards the axially inwardly facing side 29 from the outer overpressure sealing lip 31. Therefore, in the operational condition, it is possible for the outer overpressure sealing lip 31 to function to hold the structure in place by cooperating with an abutment wall 67 at the axially inner end of the receiving section 20 and preferably extends in a radial plane of the joint element 2. Nevertheless, the reduced length does not reduce the pivot range necessary for allowing for inaccuracies, of the inner overpressure sealing lip 30.

In order to release the sealed connection in the case of the working embodiment, it is only necessary for the section 8 to be axially shifted in the direction of insertion 23 so that the gripping force of the gripping fingers 9 is reduced. Since the same may be thrust as well against the nipping portion 34 and are thus able to expand the diameter of the pivot ring 49, the sealed connection may also be undone if there is a pressure in the fluid power line 22.

It will be clear that the sealing ring is able to be utilized with a reversed arrangement of the sealing lips and the sealing portion for sealing off connections in which the fluid power line is slipped over a joint element so that internal sealing is necessary.

The embodiments of the invention in which an exclusive property or privilege is claimed are defined as follows:

1. A sealing ring for providing a sealing connection between a fluid power line and a fluid power joint element, the sealing ring being arranged between a cylindrical sealing surface of a female socket part in the joint element and an outer surface of the fluid power line introduced into the female socket part from an insertion end thereof, comprising first and second integral overpressure sealing lips which have a V-like configuration on a first axially facing side thereof which is remote from the insertion end, the first overpressure sealing lip being radially outwardly of the second overpressure sealing lip and sealingly engaging with the sealing surface and the second radially inner overpressure sealing lip operatively sealingly engaging the outer surface of the fluid power line, a thrust portion provided on a second axially facing side opposite the first side, wherein the thrust portion is defined by an annular, axially extending projection which is of a reduced radially outermost dimension in relation to an axially adjoining section of the sealing ring so that in an operational position between the thrust portion and a radially inwardly facing and opposing sealing surface of the female socket there is an annular gap, and wherein a circumferentially extending inner underpressure sealing portion is provided on an inner surface of the thrust portion, and wherein the underpressure sealing portion together with the thrust portion define an integral pivot ring connected with the axially adjoining section of the sealing ring by means of a circumferentially extending flexible zone so that the inner underpressure sealing portion of the sealing ring in an operative position thereof is able to be pressed automatically radially inwardly against the outer surface of the fluid power line when the fluid power line is at a lower pressure than the surroundings.

2. The sealing ring as claimed in claim 1, wherein in a zone of an outer periphery of the sealing ring axially adjacent to the thrust portion an outer underpressure sealing portion is provided for cooperation with the sealing surface.

3. The sealing ring as claimed in claim 2, wherein the outer underpressure sealing portion is in the form of an annular bead.

4. The sealing ring as claimed in claim 2, wherein a circumferential, radially outwardly opening, recess is coaxially arranged between the outer underpressure sealing portion and the first outer overpressure sealing lip.

5. The sealing ring as claimed in claim 2, wherein the outer underpressure sealing portion is axially arranged in the zone between the inner underpressure sealing portion and the second inner overpressure sealing lip.

6. The sealing ring as claimed in claim 1, wherein a circumferentially extending radially inwardly opening recess is arranged coaxially in an axial zone between the inner underpressure sealing portion and the second inner overpressure sealing lip, the circumferentially extending radially inwardly opening recess having a configuration in the form of a letter v with sides at an obtuse angle to each other.

7. The sealing ring as claimed in claim 1, wherein the inner diameter of the second inner overpressure sealing lip is smaller than the inner underpressure sealing portion.

8. The sealing ring as claimed in claim 1, wherein a central insertion opening of the sealing ring at the second side adjacent to the pivot ring has a cone-shaped insertion zone whose diameter decreases toward the first side.

9. The sealing ring as claimed in claim 8, wherein the inner underpressure sealing portion is defined on one side thereof by the cone-shaped insertion zone and on an other side thereof by a surface of a radially inwardly opening recess.

10. The sealing ring as claimed in claim 1, wherein the inner underpressure sealing portion is in the form of an annular bead and has a circumferentially extending sealing edge.

11. The sealing ring as claimed in claim 1, wherein in an operational condition is in axially sliding engagement with the sealing surface of the joint element.

12. The sealing ring as claimed in claim 1, wherein the sealing ring is in the form of an integral elastomeric component.

13. The sealing ring as claimed in claim 1, wherein the flexible zone is defined by a zone of reduced material thickness.

14. The sealing ring as claimed in claim 1, wherein the first outer overpressure sealing lip extends axially past the second inner overpressure seal lip.

15. The sealing ring as claimed in claim 1, wherein the thrust portion has an axial end surface in which is provided a circumferentially extending axially facing recess.

* * * * *